United States Patent
Lehoczky

[15] 3,663,848
[45] May 16, 1972

[54] HIGH-SPEED ALTERNATING CURRENT GENERATORS

[72] Inventor: Kalman Nagy Lehoczky, Broholt Terrasse 10, 3024 Hyggen, Norway

[22] Filed: Feb. 2, 1971

[21] Appl. No.: 111,836

[30] Foreign Application Priority Data

Feb. 11, 1970 Norway..................................478/70

[52] U.S. Cl..................................310/90, 310/57, 310/86, 310/178, 310/262
[51] Int. Cl..................................H02k 7/08
[58] Field of Search..................310/54, 57, 90, 178, 86, 58, 310/124, 126, 112, 155, 171, 262

[56] References Cited

UNITED STATES PATENTS

| | | | |
|---|---|---|---|
| 3,571,639 | 3/1971 | Tiltins | 310/112 |
| 3,347,168 | 10/1967 | Nixon | 310/90 X |
| 3,128,712 | 5/1964 | Sence | 310/86 X |
| 3,165,655 | 1/1965 | Eis | 310/57 X |
| 2,285,960 | 6/1942 | Fechheimer | 310/54 |
| 3,261,295 | 7/1966 | White | 310/90 X |
| 2,972,308 | 2/1961 | Haggerty | 310/86 X |

Primary Examiner—J. V. Truhe
Assistant Examiner—B. A. Reynolds
Attorney—Holman & Stern

[57] ABSTRACT

A high-speed alternating current generator, for example, a gas turbine driven generator, presents complex of constructional problems. The high-speed alternating current generator of the invention is of the equi-pole type having magnetizing coils in the stator and, two or more pole units of the same polarity arranged in sequence on a common rotor. At least one bearing is formed along the rotor, the bearing being so formed that the respective part of the stator, stator laminate and/or winding are provided with a non-magnetic and/or electrically insulating lining which is permanently anchored to the stator laminate and/or other rigid construction elements, and the lubricant in the bearing is a gas or liquid in the space between rotor and stator. An evaporation-cooling system is chosen, being separated from the gas space surrounding the rotor. A twin unit construction is also disclosed.

6 Claims, 4 Drawing Figures

Patented May 16, 1972

HIGH-SPEED ALTERNATING CURRENT GENERATORS

The present invention relates to high-speed alternating current generators, particularly gas turbine operated alternating current generators. At the present time, gas turbine operation of electric generators and dynamos is carried out by reducing the high r.p.m. of 20 – 50,000 r.p.m. to about 1,500 – 3,600 revolutions, by means of a reduction gear, which corresponds to the conventional operating r.p.m. of the connected generator and to a frequency of 50 – 60 Hz. This type of operation has several disadvantages. In the first place, the frictional losses of the gear system reduces the total efficiency of the system. In the second place, the gear system and the relatively slow speed electric generator represent a substantial weight and size and amount to extra cost.

The object of the invention is to provide a generator construction which allows direct connection of the gas turbine and generator, and reduction of dimension and cost of the generator.

Two problems must first be solved. One is the mechanical problem arising from the high r.p.m., the other is the cooling.

The high r.p.m. produces great centrifugal forces and this means that the diameter of the rotor must expediently be reduced. An additional factor is that the rotor winding and its insulation being relatively vulnerable elements when subjected to centrifugal forces and heat expansion, are likely to effect great displacement in the dynamic equilibrium state of the rotor. The actual anchoring of the winding can also present great problems. The constricted conditions also entail technical problems in cooling. In view of the above considerations, the invention is based on the type of generator which has no rotor winding. Such generators are known and used as homo- or hetero-polar, medium frequency generators. These generators have their magnetizing coils in stators, the magnetic poles of the rotor being formed by slots in the peripheral surface, which, in this manner, has zones of varying magnetic reluctance along the surface. By using magnetizing coils in the stator, problems of current supply to the rotating magnet coils, slip rings, rotating rectifiers, etc., are avoided. There is much to recommend the homo-polar embodiment with an annular magnetizing coil surrounding the rotor since, in contrast to the heteropolar embodiment, this can be effected without laminated rotor. Laminating of the rotor is a great disadvantage in regard to mechanical strength and stability.

In order to reduce losses, operation with the lowest possible frequency is preferred and the aim is therefore to use as few poles as possible. The homo-polar embodiment, which excels in mechanical strength, has a further disadvantage, however, since the dimension of the magnetic path is restricted. The total magnetic flux should, in fact, be forced axially through the narrow cross section of the rotor. In this manner, on a given r.p.m., the rotor diameter and length of the unit is restricted and thereby also the maximum output of the unit. In order to overcome this problem, it is possible to use two or more units in sequence with a common through shaft and/or rotor and with common through stator winding, while using two or more magnetizing coils so that the magnetic flux axially passing the cross section of the rotor is restricted.

Certain problems in the mechanical stability of the rotor are encountered even with generators consisting of one rotor unit only. The stability of the machine is directly dependent on the diameter of the shaft and rotor respectively, and on the spacing between the bearings. It is not to be expected that such elongated, cigar-shaped rotors, as described herein, can operate under the first critical r.p.m. of the system. On the other hand, there is a relatively small air-gap between rotor and stator, and no great oscillations or deflections can be permitted therefore. To meet this situation, the generator in accordance with the invention is effected in such a way that one or more bearings are formed along the length of the rotor, a complementary bearing region being formed in respective part of the and the stator, stator laminate and/or winding are provided with a non-magnetic and/or electrically insulating lining, which is permanently anchored to the stator laminate and/or other rigid construction elements, the lubricant for the bearings being a gas or liquid located in the intermediate space between rotor and stator.

As regards the cooling technique, consideration must be taken of the fact that the generator operates in a frequency range of 200 – 800 Hz., and consequently, the proportion of iron loss and additional losses in the stator winding are relatively high. An additional feature of the present invention is the compact construction with high efficiency.

In order to ensure the best possible utilization of the materials in the machine, evaporation-cooling is used in accordance with the invention. Evaporation-cooling systems operate either with closed passages, as in conventional liquid cooling systems, or with free circulation in the interior of the machine. In view of the size and construction of the machine, the last said system is of particular interest. In evaporation-cooling it is of great importance that the static pressure level may be adjusted to a value which corresponds to the desired boiling point. It may therefore be necessary to separate the evaporated cooling circuit from the gas space (the air) which surrounds the rotor. In accordance with the invention, therefore, the generator is so constructed that the lining which forms the bearing is extended throughout the length of the machine and is connected in a gas-tight manner to the stator housing and/or the bearing shields, so that the pressure around the rotor is not influenced by the interior pressure level of the stator housing, and the stator housing is sealed gas-tight also from the ambient atmosphere of the generator.

In accordance with the invention therefore, a high-speed alternating current, gas or steam turbine operated generator of the equi-pole type is provided which has magnetizing coils in a stator of the type where two or more pole units of the same polarity are arranged in sequence on a common, through shaft and/or rotor and where the pole units can extend through stator winding which comprises two or more magnetizing coils. The alternating current generator according to the invention is characterized by a combination of the following features which are: that one or more bearings are formed along the rotor; that the bearings are formed in the respective parts of the stator, stator laminate and/or winding, and are provided with a non-magnetic and/or electrically insulating lining which is permanently anchored to the stator laminate and/or other rigid construction elements; that the lubricant in the bearings is the gas or liquid located in the space between rotor and stator; that evaporation-cooling is used, and that the evaporation-cooling circuit is separated from the gas space surrounding the rotor and that the lining which forms the bearing is extended throughout the length of the machine and is connected in a gas-tight manner to the stator housing and/or bearing shields, so that the pressure around the rotor is not influenced by the interior pressure level of the stator housing, and the stator housing is sealed gas-tight also against the ambient atmosphere of the generator.

In a homo-polar machine, the poles are displaced in relation one to the other in an axial direction. That is to say that the north poles and the south poles are in two different planes. In a two-pole machine, this means that the salient poles are rotated about 180° from one another and at a mean distance which corresponds to a little more than a pole length. This gives complete static balance but, at the same time, an enormous dynamic imbalance. This may be compensated by providing corresponding counter balance or grooves on the rotor body. This is not always possible, either due to lack of space or due to the mechanical weakness caused by the formation of the groove or counter balance which can become a cause of fatigue fracture. According to the invention, the alternating current generator in the two stator pole embodiments is assembled as a twin unit, for example, if the north poles are in continuance while the south poles in the two units are located outermost and rotated 180° in relation to the north pole.

It is advantageous to construct the alternating current generator with axial cooling, where the cooling medium circulation is in axial channels through the stator laminate and/or in stator grooves and/or in the channels of the winding. To ensure this, apertures and notches can be stamped in the stator laminate. These apertures may optionally be lined with pipes or coating, if the cooling medium is in liquid form. In regard to the grooves for the stator winding, the winding may be formed so that it does not completely fill these grooves. For example, a space may be reserved in the bottom of the groove for the cooling medium. This space may be defined by means of a pipe which extends along the groove. The pipes and coating which can be disposed in stamped grooves in the stator laminate or in the groove, must not short circuit the stator laminate and must therefore by insulated. The cross-sectional shape of the channel and the pipe may be circular, square or of other shape.

Channels in the stator winding may be provided by inserting one or more small pipes between the part conductors of the stator winding.

The aim is also to provide uniform and symmetrical temperature distribution. This is extremely important in order to avoid non-uniform temperature expansion and migration of the machine structural elements. To ensure this, it is proposed in accordance with the invention to supply the cooling medium symmetrically in relation to the pairs of stator laminate groups. The cooling medium, can, for example, be supplied at the magnetizing coil, and from there the cooling medium continues in opposing directions through the stator laminate groups, and the cooling medium outlet can be provided at both ends of the machine. Precisely the opposite is possible when the supply of cooling medium is at both ends and the outlet is in the center. In twin machines, or where several machines are on the same shaft, it is an advantage to arrange the space at the magnetizing coil as a common supply or discharge location for both adjacent units.

Cooling of the bearings may also be included in the cooling medium circuit. This is self-evident when considering a bearing or bearings in the center of the machine, for example, at the magnetizing coil. The cooling medium will then cool the casing (which forms the bearing) from without.

The invention is further described hereinafter with reference to the drawings which illustrate two exemplary embodiments.

Figure 1:
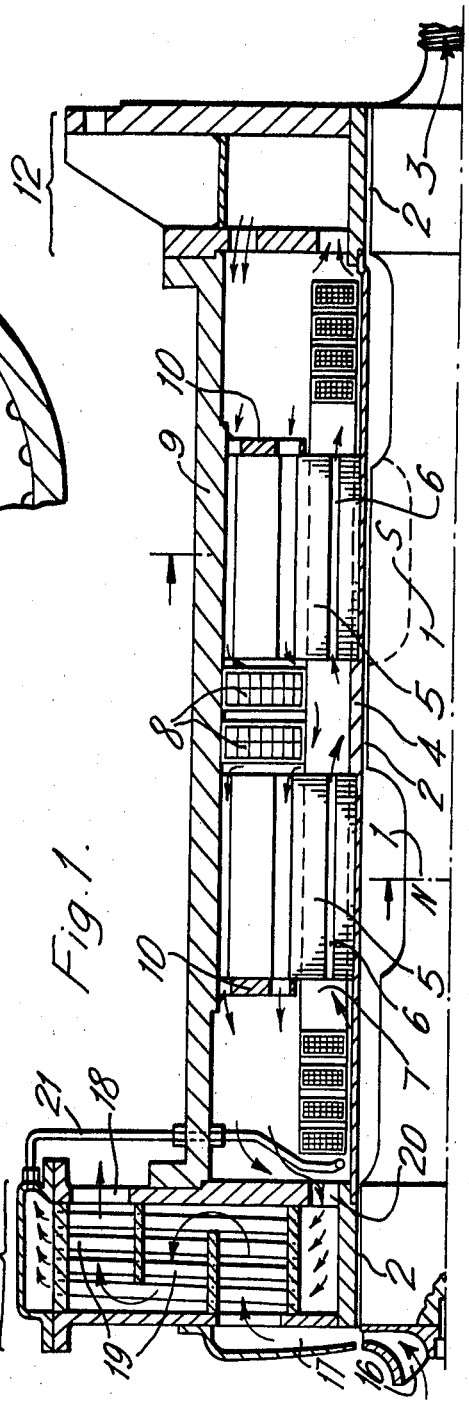
FIG. 1 shows half a longitudinal section through an evaporation cooled, homo-polar four-poled generator in accordance with the invention.

In the half section of FIG. 1, the rotor is designated by 3. The poles of the rotor are designated by 1 (N and S). The rotor is mounted by means of air bearings 2 in the stator housing 9 with appurtenant bearing shield 12 and 13. The bearing shield 12 is the bearing shield which faces towards the gas turbine (not shown which directly drives the rotor 3. The central bearing is formed by a lining 4 which extends over the entire length of the stator housing and is connected in a gas-tight manner to the bearing shields 12, 13.

The stator winding 7 and the magnetizing coils 8 are arranged in the stator housing 9. The stator laminate group is designated by 5, and the cooling channels in the stator laminate are designated by 6. Reference numeral 10 is press plates for the stator laminate.

The alternating current generator has evaporation-cooling, and for this purpose a condenser 19 is build into the bearing shield 13. The rotor 3 is provided at one end with a ventilator 16, an air channel 17 leading from this ventilator to the condenser. The condenser 19 is provided with an air outlet 18, and a passage 20 is further arranged for the return of cooling medium from the stator housing 9 and to the condenser. A conduit 21 is further provided through which condensed cooling medium may pass from the condenser to the stator housing.

Figure 3:
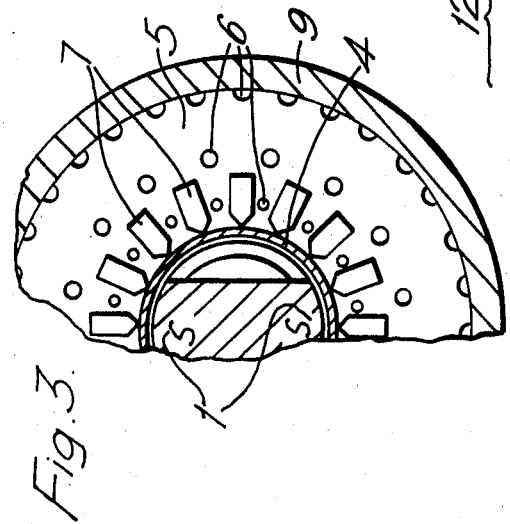
FIG. 3 shows a whole section through the machine at the area of the south pole.
Figure 2:
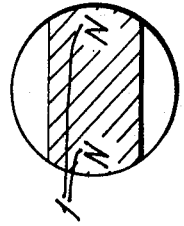
FIG. 2 shows a section through the north poles of the rotor.
Figure 4:
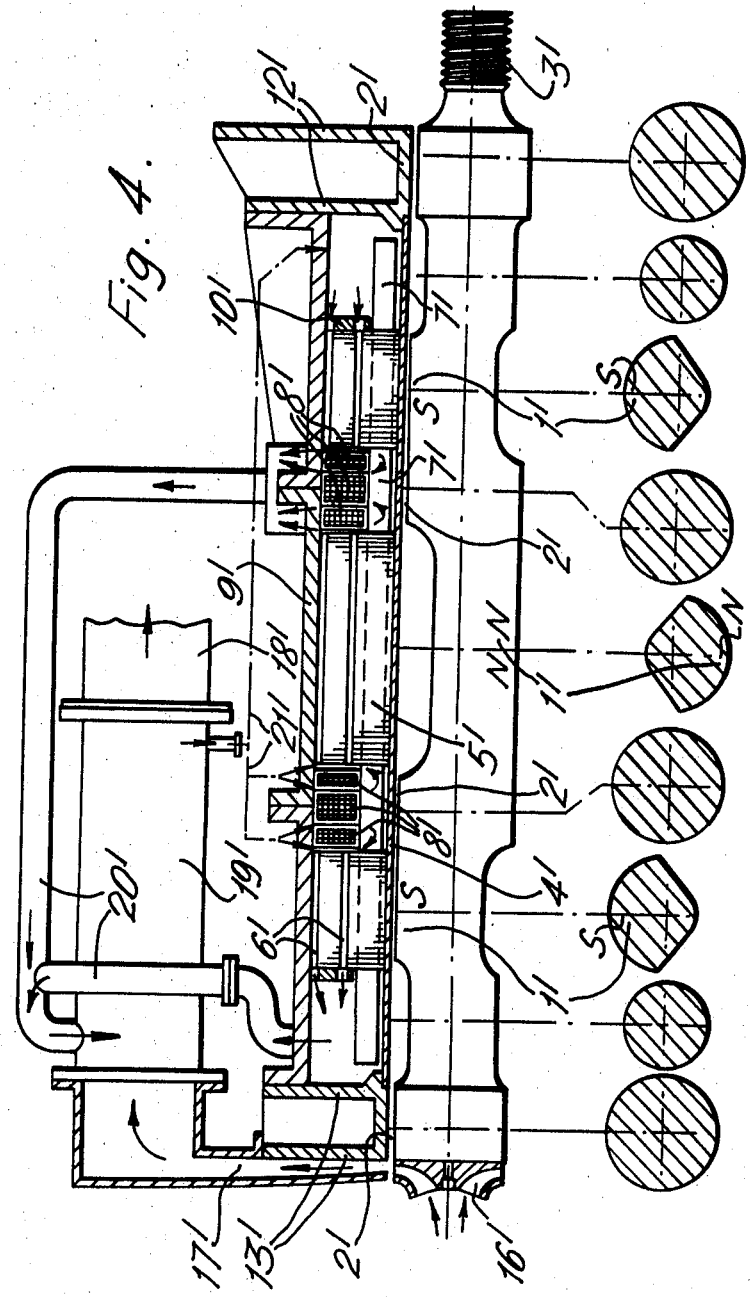
FIG. 4 shows half a longitudinal section through an evaporation cooled, homo-polar two-pole twin generator in accordance with the invention, with the rotor cross section shown in several characteristic sections.

FIG. 4 shows a longitudinal section through a somewhat different embodiment, the essential difference being merely the twin embodiment of the rotor 3, and the same reference numbers are used in FIG. 4 as in FIGS. 1, 2 and 3, but, however with the addition of an index mark. The assembly of the machine in FIG. 4 should be clear from the drawing and from the description of the machine in FIG. 1 given hereinabove.

The stator winding of the generator is a one or multiphase alternating current winding. Such windings are assembled from many conductor elements which are transposed in the stator slot, so that non-uniform current distribution between the conductor elements or strands is avoided.

The current from the generator is usually in the frequency range of 100–1,000 Hz. The current may be used either directly by the alternating current consuming equipment such as motors, thermal apparatus etc., or may be rectified. On operation through rectifiers, the generator will have a characteristic which is very similar to that of a conventional direct current commutator machine. A very stable voltage characteristic may be ensured by means of compound rings or by use of capacitors in the phase outlets. The rectifier means are of particular interest in traction use, since direct current may be transmitted to the motor or motors which drive the wheels. A combination of a gas turbine and the generator in accordance with the invention is lighter and smaller in size than a corresponding diesel electric unit. In addition, the exhaust from a gas turbine is less impure than that of a conventional diesel motor.

The circulation of the cooling gas (air) through the condenser of the evaporation-cooling and through the machine can optionally be undertaken by means of a separate fan. In the exemplary embodiment, a fan or ventilator is used which is mounted on, or formed by, the rotor of the generator. Even though the diameter of the ventilator is much restricted by the great centrifugal stresses in such an embodiment, a high pressure is obtained notwithstanding, which is of the order of some thousand m.m. water column, due to the high r.p.m.. This allows the possibility of operating with extremely narrow flow cross section, great speed and with very advantageous heat transmission coefficient.

The ventilation losses from the rotor body may be reduced in the outer bearings, which separate the interior of the machine from the ambient atmosphere, and the outer bearings are arranged entirely or partially as spiral groove bearings, and the pattern of the spiral groove may be effected so as to give a resulting pump effect which draws by suction the gas (air) from the ambient atmosphere of the rotor, and thereby reduces the static pressure. The reduced static pressure entails reduction of the specific weight of the gas, and thereby also a reduction of loss.

Reduction of ventilation losses may also be carried out by filling the intermediate spaces between the salient poles with a non-magnetic material, so that the cylindrical shape of the rotor is retained along the entire length thereof.

The magnetizing coil/coils of the generator may be made of hollow conductors having internal cooling medium circulation or can consist of circulation of medium in the intermediate spaces. Similarly, it is possible to dispose the cooling conduits and cooling bodies between the part poles respectively or between the coil and stator laminate group. In this case, the cooling channel/channels and coil/coils can transfer the axial stress in the laminate groups.

Where great demands are made with regard to the regulating speed, a part or all of the magnetized area of the stator housing may be replaced by a laminate or steel-wire bundle construction. With such a construction, the mechanical strength should be considered by using reinforcing sleeves, ribs and welding zones around the laminations or steel-wire bundle. In many cases, the stator housing will then act as an outer mechanical cover for the active magnetic components.

Having described my invention, I claim:

1. A high-speed gas or steam turbine driven a.c. generator comprising: a stator and a fluid-tight stator housing having bearing end-shields, magnetizing coils and stator windings enclosed in the stator housing; a windingless rotor having two or more pole units of the same magnetic polarity arranged in sequence on a common through shaft which is part of the rotor; first and second fluid bearings between the rotor, and the stator housing in the region of said end shields; one or more additional fluid bearings formed along the length of the rotor and intermediate between said first and second bearings; the additional bearings being formed at cylindrical regions of the rotor and complementary annular bearing regions of a lining of electrically and magnetically inactive material which lining is secured to stator laminae and a stator frame construction, said bearing lining being fluid tight and arranged to extend substantially over the length of the rotor; a common fluid lubricant in said first and second bearings and the additional bearings; an evaporation cooling circuit to cause cooling of the windings in the stator housing by means of an axial flow of a coolant in the stator housing, the cooling circuit being isolated from the ambient atmosphere and the bearing fluid located in an annular gap on the rotor surface so that the pressure of the bearing fluid around the rotor surface is independent of the internal pressure level of the stator housing which is itself sealed from the atmosphere.

2. An a.c. generator as claimed in claim 1, wherein the rotor has a two-pole construction formed as a twin unit wherein two north poles are disposed in continuation, south poles in the two units being outermost and shifted in phase in relation to the north pole.

3. An a.c. generator as claimed in claim 1, which includes coolant varying tubes and ducts disposed in the stator parallel to the generator axis.

4. An a.c. generator as claimed in claim 1, which includes means to arrange the stator coolant flow symmetrically in relation to pairs of stator laminate groups.

5. An a.c. generator as claimed in claim 4, which includes stator coolant inlet means at the ends of the stator housing, and an outlet means at substantially the middle region of the stator housing.

6. An a.c. generator as claimed in claim 4, which includes stator coolant flow inlet means substantially at the center of the stator housing, and outlet means for the coolant being at the end regions of the stator housing.

* * * * *